United States Patent
Korva

(10) Patent No.: US 12,003,038 B2
(45) Date of Patent: Jun. 4, 2024

(54) ARRAY OF PATCH ANTENNAS

(71) Applicant: Nokia Technologies Oy, Espoo (FI)

(72) Inventor: Heikki Tapani Korva, Tupos (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/665,094

(22) Filed: Feb. 4, 2022

(65) Prior Publication Data
US 2022/0255222 A1    Aug. 11, 2022

(30) Foreign Application Priority Data

Feb. 8, 2021    (FI) .................................... 20215128

(51) Int. Cl.
*H01Q 19/00*    (2006.01)
*H01Q 3/36*    (2006.01)
*H04B 7/0456*    (2017.01)

(52) U.S. Cl.
CPC ............. *H01Q 3/36* (2013.01); *H04B 7/0469* (2013.01)

(58) Field of Classification Search
CPC ........ H04B 7/0469; H01Q 1/523; H01Q 1/48; H01Q 1/246; H01Q 1/273; H01Q 1/38; H01Q 1/50; H01Q 19/005; H01Q 25/001; H01Q 21/065; H01Q 21/0006
See application file for complete search history.

(56) References Cited

U.S. PATENT DOCUMENTS

| | | | |
|---|---|---|---|
| 6,025,812 A | 2/2000 | Gabriel et al. | |
| 8,879,997 B2 | 11/2014 | Barker et al. | |
| 9,099,985 B2 | 8/2015 | Huang et al. | |
| 10,476,149 B1 | 11/2019 | Ueda | |
| 11,245,199 B2 * | 2/2022 | Liu | H01Q 21/062 |
| 2014/0043195 A1 | 2/2014 | Ho et al. | |
| 2016/0211585 A1 * | 7/2016 | Chau | H01Q 21/062 |
| 2019/0131701 A1 | 5/2019 | Watanabe et al. | |
| 2020/0295454 A1 | 9/2020 | Yun et al. | |
| 2020/0328531 A1 | 10/2020 | Onaka et al. | |

(Continued)

FOREIGN PATENT DOCUMENTS

| | | |
|---|---|---|
| CN | 103943970 A | 7/2014 |
| CN | 109216940 A | 1/2019 |
| EP | 3618190 A1 | 3/2020 |

(Continued)

OTHER PUBLICATIONS

Extended European Search Report received for corresponding European Patent Application No. 22155135.1, dated Jun. 22, 2022, 9 pages.

(Continued)

*Primary Examiner* — Awat M Salih
(74) *Attorney, Agent, or Firm* — SQUIRE PATTON BOGGS (US) LLP

(57) ABSTRACT

An apparatus comprising:
  a ground plane;
  an array of antennas, wherein the array comprises antennas arranged in parallel rows and parallel columns;
  for one or more columns of the antennas in the array, there is an aligned arrangement of coupling elements comprising coupling elements between the antennas in the respective column,
  wherein the coupling elements are separate from the antennas and are electrically floating.

16 Claims, 16 Drawing Sheets

(56) References Cited

U.S. PATENT DOCUMENTS

2021/0111482 A1\* 4/2021 Raj .................. H01Q 5/42

FOREIGN PATENT DOCUMENTS

| GB | 2384369 B | 7/2005 | | |
|---|---|---|---|---|
| WO | 2018/053698 A1 | 3/2018 | | |
| WO | 2019/165915 A1 | 9/2019 | | |
| WO | WO-2019165915 A1 * | 9/2019 | .............. | H01Q 1/38 |
| WO | 2020/048042 A1 | 3/2020 | | |
| WO | 2020/141251 A1 | 7/2020 | | |
| WO | 2020/194188 A2 | 10/2020 | | |

OTHER PUBLICATIONS

Alzidani et al., "Ultra-wideband Differential Fed Hybrid Antenna with High Cross Polarization Discrimination for Millimeter Wave Applications", IEEE Access, vol. 4, 2016, pp. 1-12.

Yang et al., "Cavity-Backed Slot-Coupled Patch Antenna Array With Dual Slant Polarization for Millimeter-Wave Base Station Applications", IEEE Transactions on Antennas and Propagation, vol. 69, No. 3, Mar. 2021, pp. 1-9.

Office action received for corresponding Finnish Patent Application No. 20215128, dated Jun. 4, 2021, 9 pages.

\* cited by examiner

ARRAY OF PATCH ANTENNAS

TECHNOLOGICAL FIELD

Embodiments of the present disclosure relate to an array of patch antennas.

BACKGROUND

An array of patch antennas can be used in beam-steering applications.

In multiple user MIMO (multiple input multiple output) applications, a narrow antenna beam, formed by a phased array of patch antennas at a transmitter/receiver can be steered towards a receiver/transmitter.

BRIEF SUMMARY

According to various, but not necessarily all, embodiments there is provided an apparatus comprising:
  a ground plane;
  an array of antennas, wherein the array comprises antennas arranged in parallel rows and parallel columns;
  for one or more columns of the antennas in the array, there is an aligned arrangement of coupling elements comprising coupling elements between the antennas in the respective column,
  wherein the coupling elements are separate from the antennas and are electrically floating.

In some but not necessarily all examples, the coupling elements increase cross-polarization discrimination for the array of antennas, at boresight, being a direction orthogonal to a flat plane of the array of antennas.

In some but not necessarily all examples, the coupling elements are elongate having a length greater than a width, and wherein the aligned arrangement of coupling elements in the respective columns are aligned lengthwise.

In some but not necessarily all examples, the aligned arrangement of coupling elements in a respective column are arranged along a virtual line that bi-sects the antennas of the respective column.

In some but not necessarily all examples, the coupling elements are flat conductive elements.

In some but not necessarily all examples, the apparatus comprises a printed wiring board, wherein the printed wiring board comprises the coupling elements and comprises the antennas.

In some but not necessarily all examples, a respective column of the aligned arrangement of coupling elements comprises coupling elements of the same size and shape between the antennas of the respective column.

In some but not necessarily all examples, the coupling elements do not vary their characteristics in a column direction In some but not necessarily all examples, the coupling elements vary their characteristics in a row direction.

In some but not necessarily all examples, the coupling elements are closer to adjacent antennas in a column of the array, in a column direction, for a column towards a center of the array of antennas than for a column towards a periphery of the array of antennas.

In some but not necessarily all examples, each of the antennas in the array of antennas comprises a radiator and feeds for a first polarization and a second polarization orthogonal to the first polarization.

In some but not necessarily all examples, the apparatus comprises means for controlling at least phase between feeds.

In some but not necessarily all examples, the apparatus comprises means for providing a relative phase adjustment to groups of antennas in the array of antennas, wherein the same relative phase adjustment is applied to antennas within a group and different relative phase adjustment is applied to antennas in different groups to effect beam-steering.

In some but not necessarily all examples, the apparatus comprises grounded isolation towers positioned at corners of antennas in the array of antennas.

According to various, but not necessarily all, embodiments there is provided a base station system or portable electronic device configured for multiple-input multiple-output operation and comprising the apparatus.

According to various, but not necessarily all, embodiments there is provided examples as claimed in the appended claims.

BRIEF DESCRIPTION

Some examples will now be described with reference to the accompanying drawings in which.

DETAILED DESCRIPTION

Figure 1:
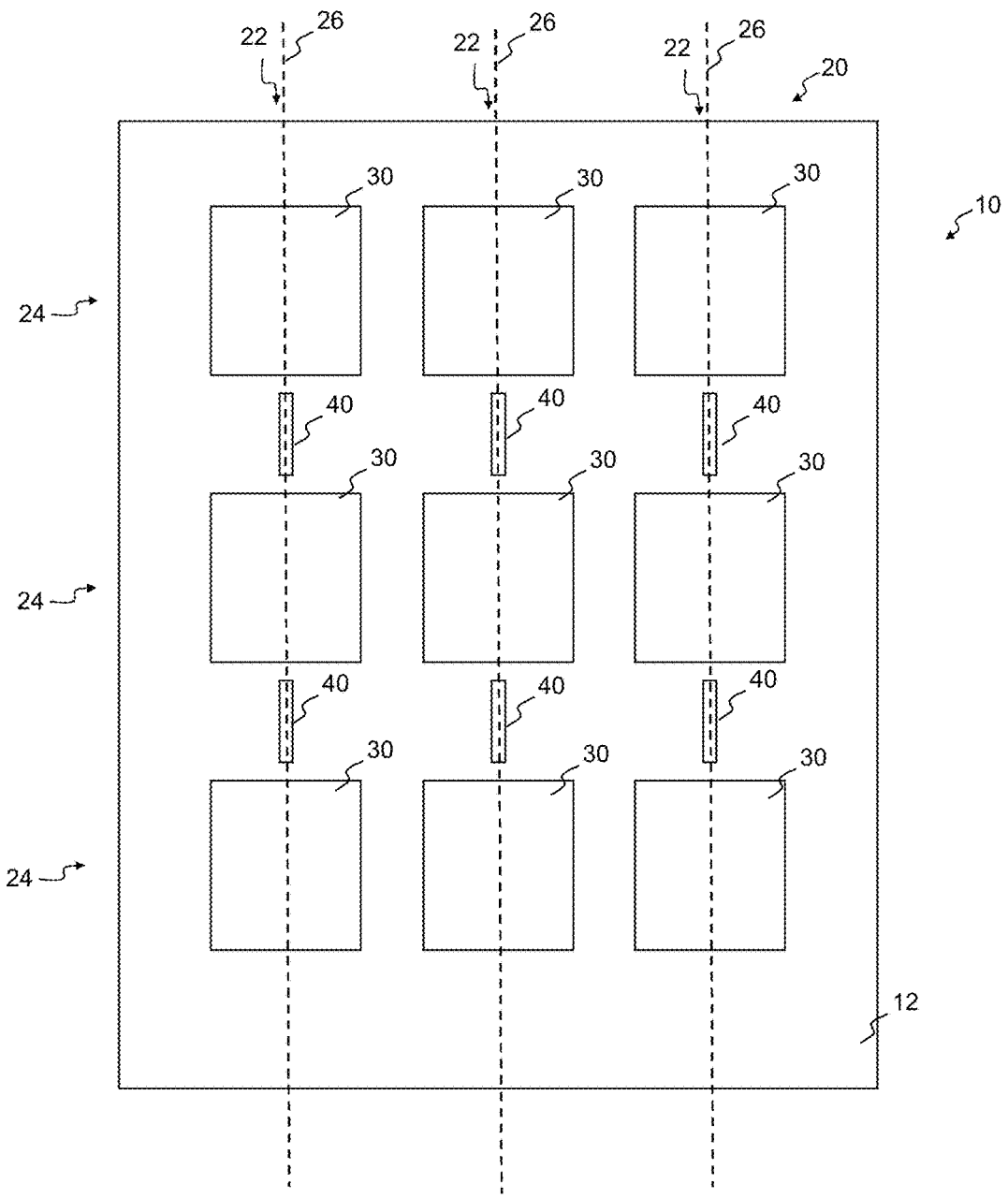
FIG. 1 shows an example of the subject matter described herein.

The following disclosure describes different examples of an apparatus 10 comprising: a ground plane 12 and an array 20 of antennas 30.

The array 20 comprises antennas 30 that can be arranged in parallel rows 24 and parallel columns 22.

In some examples, the array 20 is a regular array and comprises antennas 30 arranged in parallel rows 24 and parallel columns 22.

For one or more columns 22 of the antennas 30 in the array 20, there is an aligned arrangement of coupling elements 40 comprising coupling elements 40 between the antennas 30 in the respective column 22. The coupling elements 40 are separate from the antennas 30 and are electrically floating.

A ground plane is a technical term that refers to a conductive element at local ground potential. It provides a common ground potential at multiple different locations within the apparatus 10. However, it is not necessarily physically planar and can have any suitable physical topology. In some examples it can be physically planar. In some examples it can be physically planar and also flat.

In some but not necessarily all examples, in use, the columns 22 are aligned along virtual vertical lines and the rows 24 are aligned along virtual horizontal lines. In this orientation, the antennas 30 are separated vertically by coupling elements 40.

The antennas 30 can be any suitable antennas. In the following examples patch antennas 30 are used.

Referring to FIG. 1, the array 20 has patch antennas 30 aligned in columns 22 and aligned in rows 24.

Each of the M rows has N patch antennas 30 and each of the N columns has M patch antennas 30. The patch antennas 30 in at least some of the columns of the array 20 are separated by coupling elements 40. The coupling elements 40 in a particular column form an aligned arrangement. The coupling elements are aligned along virtual lines 26 that run parallel to the columns.

In this example, but not necessarily all examples, patch antennas 30 of the array 20 are separated, vertically, by coupling elements 40.

The coupling elements 40 are separate from the patch antennas 30 and are electrically floating. The conductive elements 40 are conductive and are not galvanically connected to an electric potential, for example the ground plane 12, or another conductive part of the apparatus 10. This allows the electrostatic potential of a coupling element 40 to 'float'.

The arrangement of coupling elements 40, in the example of FIG. 1, has a number of distinctive characteristics. For example, only one coupling element 40 is between neighboring patch antennas 30 in the column 22 direction. For example, for the rows 24 of patch antennas 30 in the array 20, there is no coupling element between the patch antennas 30 in the same row. For example, the columns 22 that have coupling elements 40 have the same coupling element 40 between patch antennas 30 in that column, that is, the coupling elements 40 in a column have the same characteristics such as shape, size and position relative to the patch antennas 30. Thus any respective column 22 of the aligned 26 arrangement of coupling elements 40 comprises coupling elements 40 of the same size and shape between the patch antennas 30 of the respective column.

The arrangement of coupling elements 40, in the example illustrated, has reflection symmetry in a virtual mid-line (not illustrated) through boresight and parallel to the columns 22 of the array 20 and has reflection symmetry in a virtual mid-line (not illustrated) through boresight and parallel to the rows 24 of the array 20. The example arrangement of coupling elements 40 has 180 degree rotational symmetry about the boresight but does not have 90 degree rotational symmetry about the boresight.

The coupling elements 40 increases cross-polarization discrimination for the array 20 of patch antennas 30, at boresight (a direction orthogonal to a flat plane of the array 20 of patch antennas 30).

In at least some examples, the cross-polarization component of electric field is decreased at the boresight by the presence of the coupling elements 40.

Figure 2:
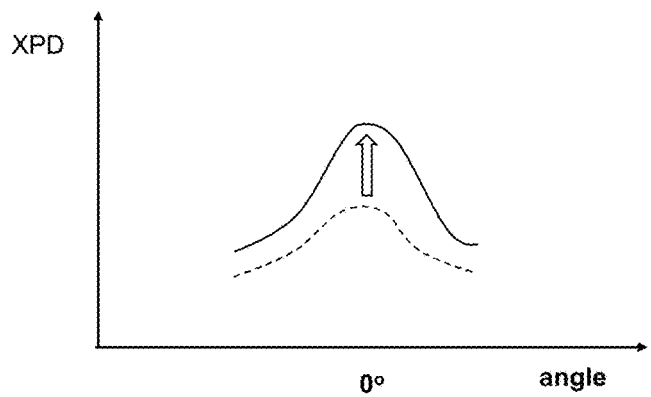
FIG. 2 shows another example of the subject matter described herein.

FIG. 2 illustrates cross-polarization discrimination (XPD) for the array 20 of patch antennas 30, at boresight, without the coupling elements 40 (dotted line) and with the coupling elements 40 (solid line). It can be seen that the presence of the coupling elements 40 increase cross-polarization discrimination for the array 20 of patch antennas 30, at boresight.

Figure 3:
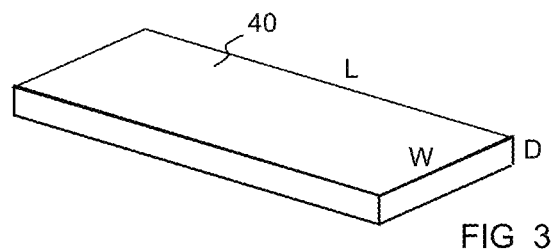
FIG. 3 shows another example of the subject matter described herein.

As illustrated in more detail in FIG. 3, the coupling elements 40 are, in at least some examples, elongate coupling elements 40 having a length L greater than a width W. The coupling element 40 has a strip shape. In the illustrated example, the width W is greater than a depth D. In at least some examples, the length L of the elongate coupling elements 40 extends vertically, the width W of the coupling elements 40 extends horizontally and a depth (or height) of the coupling elements 40 extends outwardly. In the illustrated example, the coupling elements 40 are flat conductive elements (without slots or walls). The coupling elements 40 are galvanically isolated from each other and other conductors. The term 'galvanically isolated' means that there is no conductive direct current path.

Referring back to the example, of FIG. 1 the aligned arrangement of coupling elements 40 in the respective columns 22 are aligned lengthwise along the virtual lines 26. In the particular example illustrated, a virtual line 26 travels lengthwise through the coupling elements 40 in a column 22 and bi-sects each of the coupling elements 40 widthwise.

In the illustrated examples and other examples, the coupling elements 40 have a fixed, constant width along their length. However, in some other examples, the coupling elements can have a variable width along their length. For example, the coupling elements 40 can be tapered.

Figure 4:
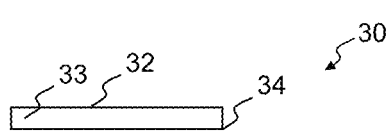
FIG. 4 shows another example of the subject matter described herein.

In at least some examples, some or all of the patch antennas 30 of the array 20 has a patch radiator 32 and feeds 34 for a first polarization and a second polarization orthogonal to the first polarization. FIG. 4 illustrates in cross-sectional view an example of such a patch antenna 30. In FIG. 4, the radiator 32 of patch antenna 30 is separated from the feeds 34 by dielectric 33. In this example, the boresight direction is vertical within the plane of the paper.

The patch radiators 32 also form an array corresponding to the array 20. In at least some examples, some or all of the patch radiators 32 of the array have the same operational frequency range (or ranges). Consequently, in at least some examples, some or all of the patch radiators 32 of the array of patch radiators have the same size and shape which define electrical characteristics such as electrical length. In at least some examples, some or all of the patch radiators 32 of the array of patch radiators have the same feed arrangement of feeds 34.

Figure 5:
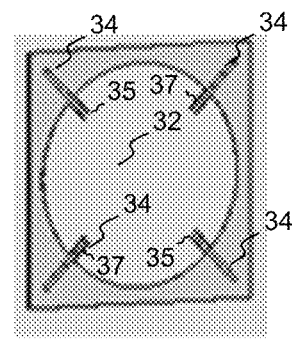
FIG. 5 shows another example of the subject matter described herein.

FIG. 5 illustrates, in plan view, an example of a feed arrangement that provides feeds 34 for a first polarization and a second polarization orthogonal to the first polarization. The dual polarized feed arrangement is a balanced feed with opposing conductive feed elements 35 configured to provide a feed 34 for the first polarization and opposing conductive feed elements 37 configured to provide a feed 34 for the second polarization.

The feed elements 35, 37 lie in a flat plane that is parallel to the plane of the patch radiator 32. The feed elements 35 are aligned in that flat plane in a direction offset by −90 degrees from a direction in that flat plane in which the feed elements 37 are aligned. The center of the feed arrangement, where virtual lines through the feed elements 35 and the feed elements 37 meet, is aligned with virtual line 26 (not illustrated in this FIG). This provides symmetrical coupling between the different polarizations.

In this example, the feed element of the feed 34, on the combiner PCB is circular and the patch radiators are rectangular.

Figure 6A:
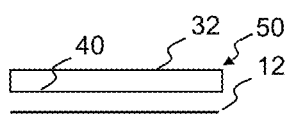
FIG. 6A, 6B, 6C show other examples of the subject matter described herein.
Figure 6B:
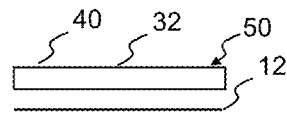
Figure 6C:
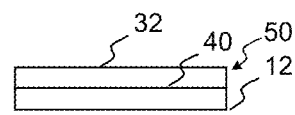

FIGS. 6A, 6B, 6C illustrate some but not necessarily all of the arrangements possible for the ground plane 12, a patch radiator 32 of the patch antenna 30 and associated coupling elements 40. The ground plane 12 lies in a flat plane, patch radiator 32 lies in a flat plane, the coupling element 40 lies in a flat plane.

In each of FIGS. 6A, 6B, 6C the ground plane 12 is physically separated from the patch radiator 32.

The ground plane 12 and the patch radiator 32 are not co-planar. In FIGS. 6A and 6C, the patch radiator 32 and its adjacent coupling element(s) 40 are not co-planar. In FIG. 6B, the patch radiator 32 and its adjacent coupling element(s) 40 are co-planar.

In FIG. 6A, the patch radiator 32 and its adjacent coupling element(s) 40 are provided by a printed wiring board (PWB) 50. The patch radiator 32 occupies one side (or layer) of the PWB 50 and the coupling element(s) 40 occupy a different side (or layer) of the PWB 50.

In FIG. 6B, the patch radiator 32 and its adjacent coupling element(s) 40 are provided by a printed wiring board (PWB) 50. The patch radiator 32 occupies one side (or layer) of the PWB 50 and the coupling element(s) 40 occupy the same side (or layer) of the PWB 50.

In FIG. 6C, the ground plane 12, the patch radiator 32 and its adjacent coupling element(s) 40 are provided by a printed wiring board (PWB) 50. In this example, ground plane 12 occupies one side (or layer) of the PWB 50, the patch radiator 32 occupies a different side (or layer) of the PWB 50 and the coupling element(s) 40 occupies a side (or layer) of the PWB 50. The side (or layer) of the PWB 50 occupied by the coupling element(s) 40 can be the same side (or layer) to that occupied by the patch radiator 32 or can be a different side (or layer) to that occupied by the patch radiator 32.

In some examples, the coupling elements 40 of the apparatus 10 can occupy a common side (or layer) of the PWB 50. In some examples, the coupling elements 40 of the apparatus 10 can occupy more than one side (or layer) of the PWB 50.

The feeds 34 are not illustrated in FIGS. 6A, 6B, 6C for clarity of illustration. The feeds will normally be provided in a single flat plane. They can be provided as part of a PWB 50 or separately to it. The feeds 34 are in some examples in a different plane to the patch radiators 32. The feeds 34 in at least some of these examples, or in other examples, are in a different plane to the coupling elements 40.

Figure 7:
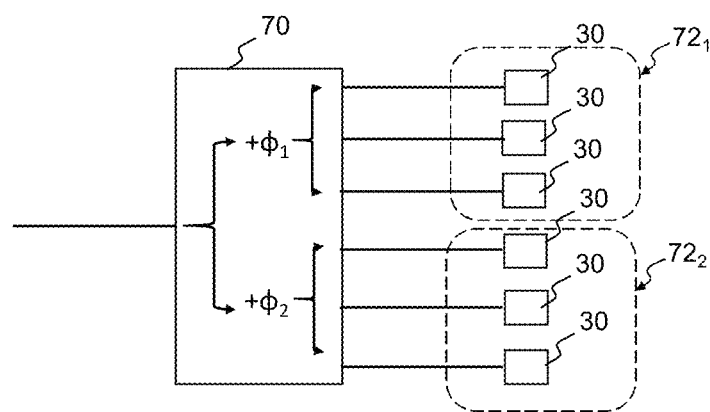
FIG. 7 shows another example of the subject matter described herein.

FIG. 7 illustrates an example of the apparatus 10 that comprises phase control circuitry 70. Phase control circuitry 70 is used to control application of a phase difference between two signals.

In this example, the phase control circuitry 70 is configured to provide a relative phase adjustment to groups 72 of patch antennas 30 in the array 20 of patch antennas 30. For example, the same relative phase adjustment $\varphi_1$ is applied to patch antennas 30 within a group $72_1$ and different relative phase adjustment(s) $\varphi_2, \varphi_3 \ldots \varphi_N$ is applied to patch antennas 30 in different groups $72_2, 72_3 \ldots 72_N$ to effect beam-steering.

For example, referring back to FIG. 1 to effect beam steering in an azimuthal direction (horizontal) then phase offset applied by phase control circuitry 70 varies across the columns. To effect beam steering in an elevation direction (vertical) then phase offset applied by phase control circuitry 70 varies across the rows. To effect beam steering in both an azimuthal (horizontal) and an elevation (vertical) direction then phase offset applied by phase control circuitry 70 varies across the columns and the across the rows.

Figure 11:
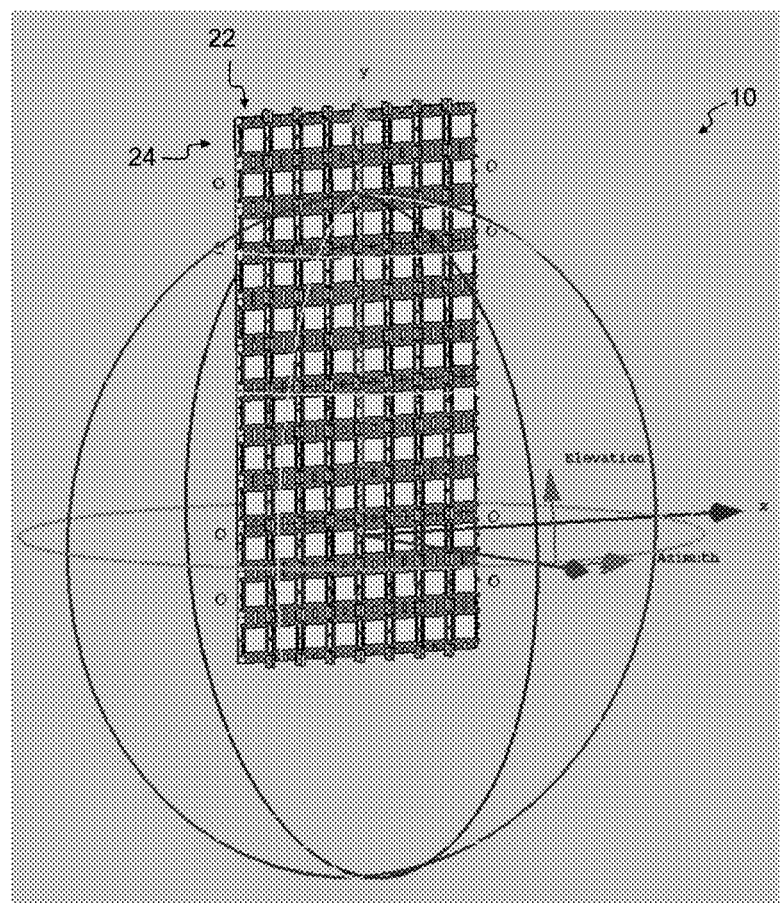
FIG. 11 shows another example of the subject matter described herein.

For example, the M (M=12) row by N (N=8) column array illustrated in FIG. 11 could be logically divided into groups (sub-arrays) of size m (m=3) rows by n (n=1) columns. This makes a 4×8 array of groups. To effect beam steering in an azimuthal direction (horizontal) then phase offset applied by phase control circuitry 70 varies with each horizontal group e.g. by each column. To effect beam steering in an elevation direction (vertical) then phase offset applied by phase control circuitry 70 varies with each vertical group e.g. each group of m=3 patch antennas 30 have the same phase offset and each of the four groups of m=3 patch antennas 30 within the column of M=12 patch antennas has a different phase offset. To effect beam steering in an azimuthal direction (horizontal) and elevation direction (vertical) then phase offset applied by phase control circuitry 70 varies with each horizontal group (e.g. each N/n groups of n=1 patch antennas 30 have a different phase offset) and varies with each vertical group (e.g. each group of m=3 patch antennas 30 have the same phase offset and each of the M/m (4) groups of m=3 patch antennas 30 within the column of M=12 patch antennas has a different phase offset).

The arrangement of patch antennas 30 and coupling elements 40 is not symmetric in the horizontal and vertical. For example, the size and shape of the patch radiators 32 are not symmetric, the spacing between patch radiators 32 is not symmetric, the distribution of coupling elements 40 is not symmetric and the shape of coupling elements 40 is not symmetric. For example, there may be different beam-steering requirements in the azimuthal (horizontal) and the elevation (vertical) directions. Typically, an azimuth (horizontal) beam steering angle is much wider (for example +/−50 deg) than elevation (for example +/−5 deg). To avoid grating lobes at large azimuth steering angles the spacing between patch radiators 32 can be close to half wavelength in the horizontal direction (between columns, within rows).

In the particular arrangement of coupling elements 40 illustrated in FIG. 1, but not necessarily all examples, the coupling elements 40 are the same in all columns, that is, the coupling elements 40 in different columns have the same characteristics such as shape, size and position relative the patch antennas 30. The coupling elements 40 do not vary their characteristics in the column direction However, in other examples, the coupling elements 40 are not all the same or are not the same across all different columns.

Figure 8:
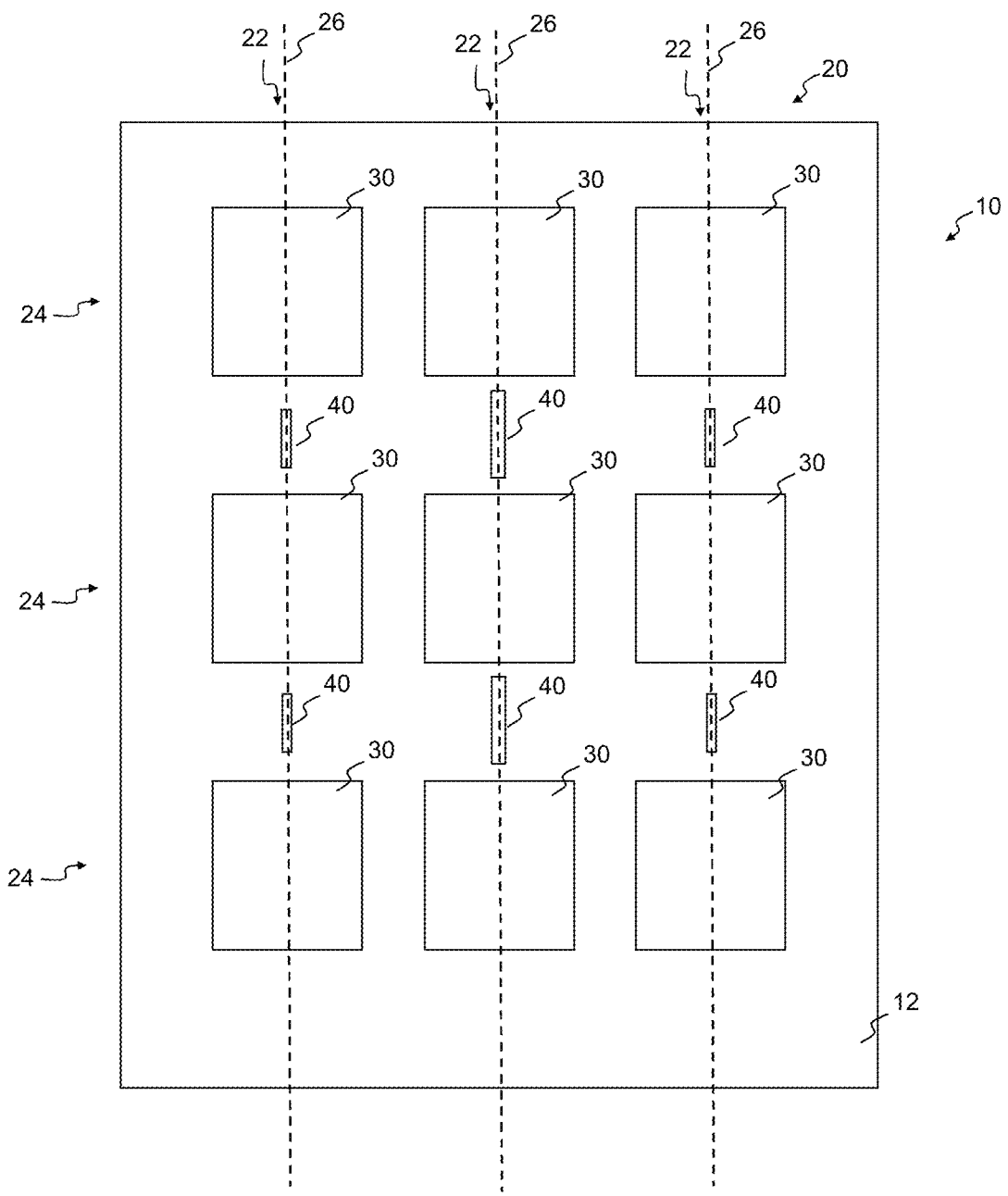
FIG. 8 shows another example of the subject matter described herein.

In the example illustrated in FIG. 8, which is the same as FIG. 1 except for the arrangement of coupling elements 40, the coupling elements 40, if present in a particular column, are the same that is, the coupling elements 40 have the same characteristics such as shape, size and position relative the patch antennas 30. However, the coupling elements 40 in different columns are not necessarily the same and have different characteristics such as different shape, different size and/or different position relative the patch antennas 30.

In FIG. 8, the coupling elements 40 vary their characteristics in the row 24 direction (less coupling as one moves to the outer peripheral columns). The coupling elements 40 are closer to adjacent patch antennas 30 in a column, in a column 22 direction, at the center of the regular array 20 of patch antennas 30, than in a column towards a periphery or edge of the regular array 20 of patch antennas 30. Thus a length of a coupling elements 40 decreases with distance in a first direction from a center of the array 20 and a size of a gap (in a second direction orthogonal to the first direction) increases with distance in the first direction from the center of the array 20. In the example illustrated, but not necessarily all examples, the first direction is an azimuthal (horizontal) direction and the second direction is an elevation (vertical) direction.

Figure 9:
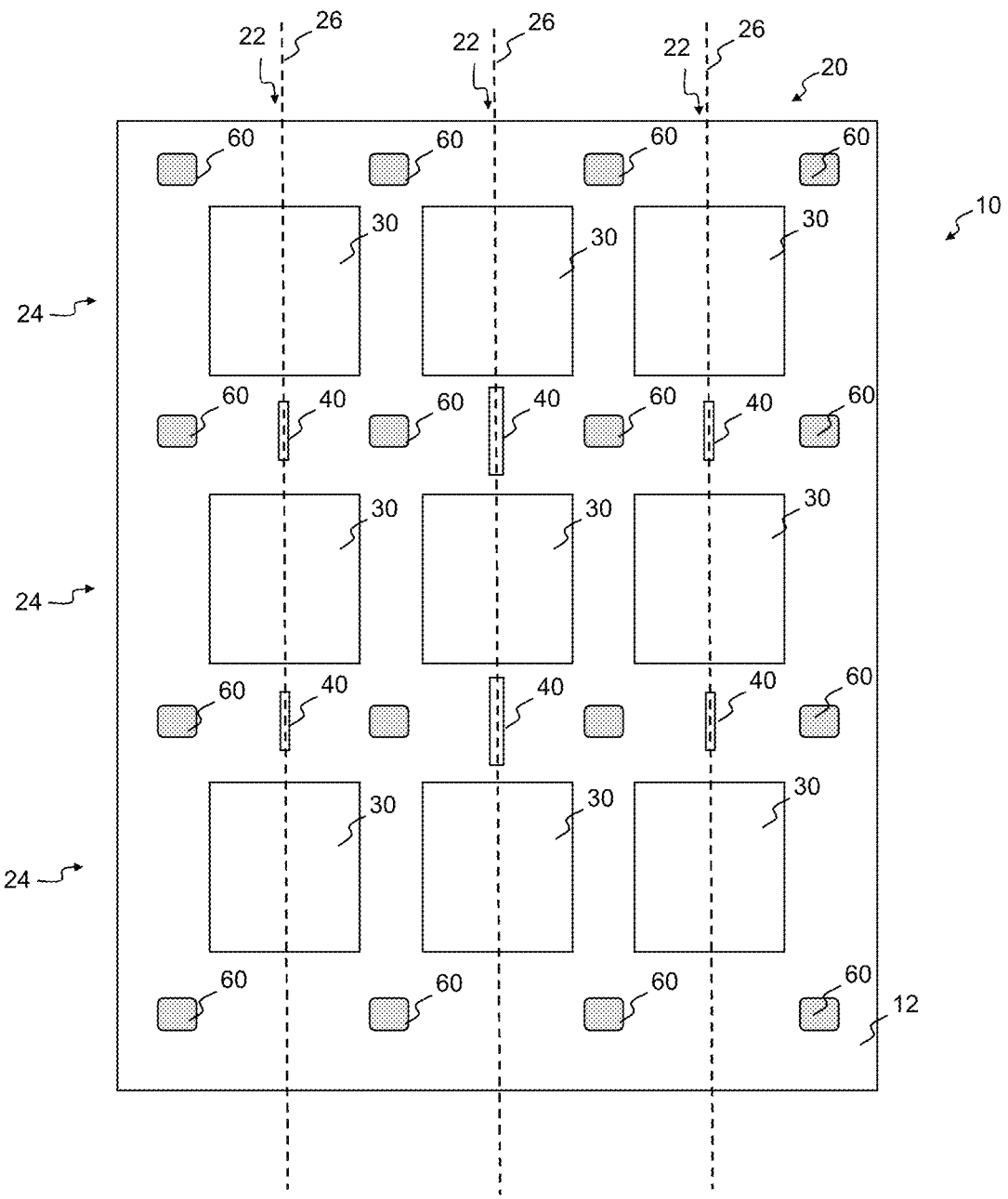
FIG. 9 shows another example of the subject matter described herein.

In some but not necessarily all examples, the apparatus 10 additionally comprises grounded isolation towers 60 as illustrated in FIG. 9. The example of FIG. 9 is based on the previous example of FIG. 8 but grounded isolation towers 60 can be used with the example of FIG. 1 or other examples.

The grounded isolation towers 50 are conductive elements that extend outwardly from the plane of the page and have a depth (height) in that direction that is significant compared to in-plane dimensions such as, for example, the azimuthal (horizontal) dimension (width) or elevation (vertical) dimension (length). The grounded isolation towers 50 therefore have a relative height/depth, compared to width and length dimensions, that is much greater than that of a coupling element 40.

The grounded isolation towers 50 are galvanically interconnected to the ground plane 12.

If a PWB 50 is used, then the grounded isolation towers 50 can be formed as vias within the PWB 50, for example, extending from the ground pane 12.

A grounded isolation tower 50 is positioned at corners of patch antennas 30. For example, where four corners of four different patch antennas 30 face each other there is a grounded isolation tower 50. The grounded isolation towers 50 form a regular array and are positioned where an (interstitial) space between columns 22 of patch antennas 30 and an (interstitial) space between rows 24 of patch antennas 30 meet. In the example illustrated the array 20 of patch antennas 30 is an N row by M column array. In this example, but not necessarily all examples, that array of grounded isolation towers 50 comprises an (N−1) row by (M−1) column array that is 'within' the array 20.

In the illustrated example, the grounded isolation towers 50 are positioned at corners of patch antennas 30 in the regular array of patch antennas. In the example illustrated the array 20 of patch antennas 30 is an N row by M column array. In this example, but not necessarily all examples, that array of grounded isolation towers 50 is an (N+1) row by (M+1) column array. A grounded isolation tower 50 is positioned at each corner of each patch antenna 30.

Figure 10:
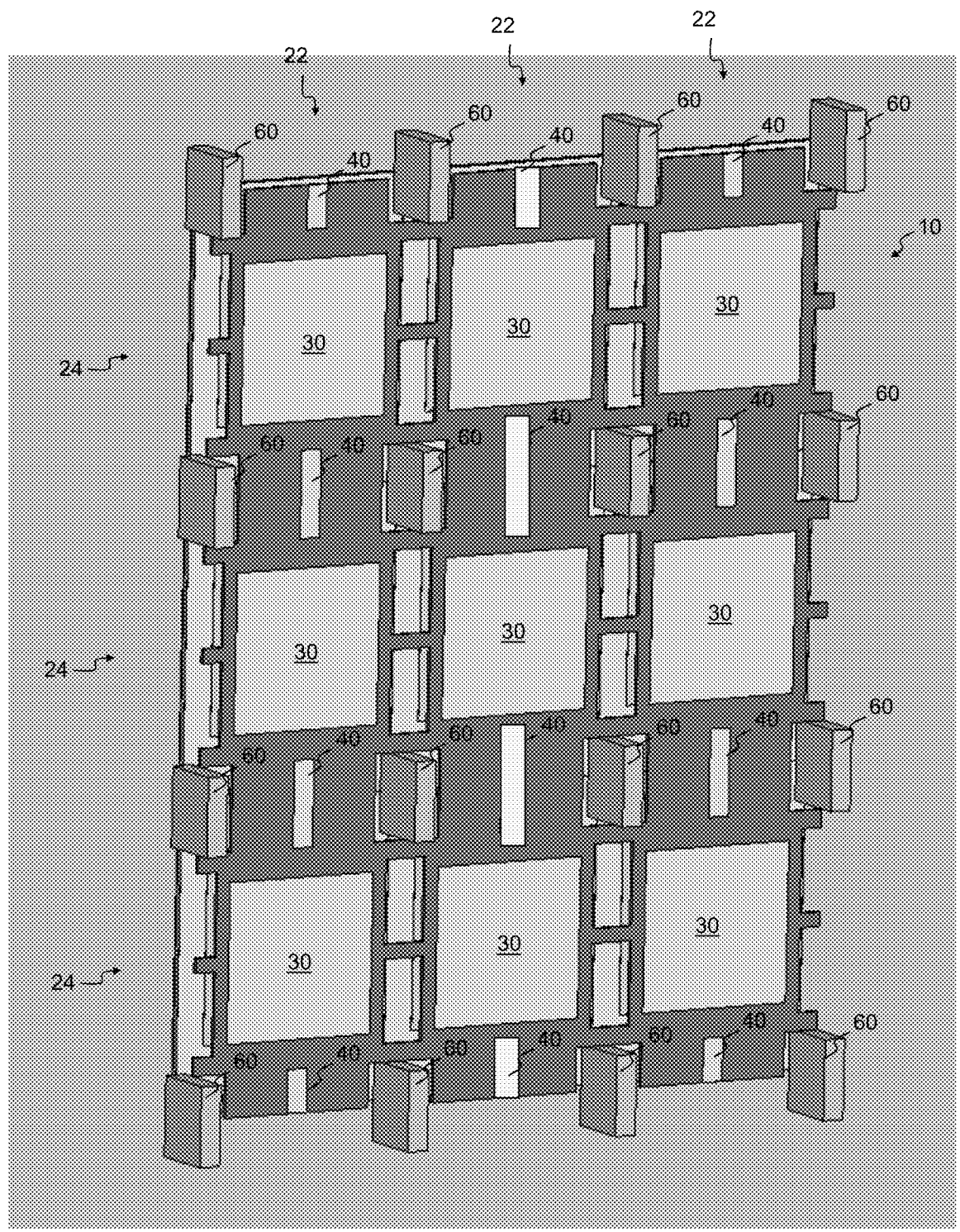
FIG. 10 shows another example of the subject matter described herein.
Figure 12:
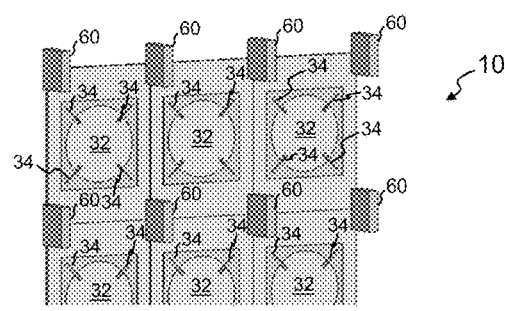
FIG. 12 shows another example of the subject matter described herein.

FIG. 10 illustrates an example of a portion of an apparatus 10 as previously described. It has similarities to the apparatus 10 illustrated in FIG. 9. It comprises grounded isolation towers 60 and also comprises coupling elements 40 of variable area and/or length. FIG. 11 illustrates an example of a whole apparatus 10 of which the portion illustrated in FIG. 10 is a part. FIG. 12 illustrates an example of a part of the feed arrangement for the apparatus 10 of FIG. 11. The feed arrangement comprises feeds 34 and is similar to that previously described with reference to FIG. 5.

In this example the array has a length (vertical) of 720 mm and a width (horizontal) of 420 mm. The horizontal spacing between patch radiators 32 is 32 mm. The vertical spacing between patch radiators is 42 mm. The patch radiators are separated from the ground plane 12 by a distance of 4.2 mm.

Figure 13:
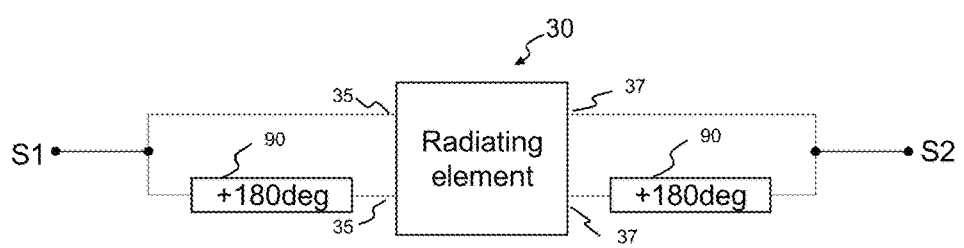
FIG. 13 shows another example of the subject matter described herein.

FIG. 13 illustrates circuitry for providing feeds 34 for a first polarization and a second polarization orthogonal to the first polarization. The dual polarized feed arrangement is a balanced feed with opposing conductive feed elements 35 configured to provide a feed 34 for the first polarization and opposing conductive feed elements 37 configured to provide a feed 34 for the second polarization.

A feed 51 for a first signal connects via a 180 degree balun. A feed S2 for a second signal connects via a 180 degree balun.

FIGS. 14B, 15B, 16B, 17B, 18B illustrate simulated characteristics of the apparatus 10 as previously described. FIGS. 14A, 15A, 16A, 17A, 18A illustrate simulated characteristics of the apparatus 10, if adapted to remove the coupling elements 40. A comparison of the respective figures FIGS. 14A, 15A, 16A, 17A, 18A against FIGS. 14B, 15B, 16B, 17B, 18B illustrates effects of the coupling elements 40.

Figure 14A:
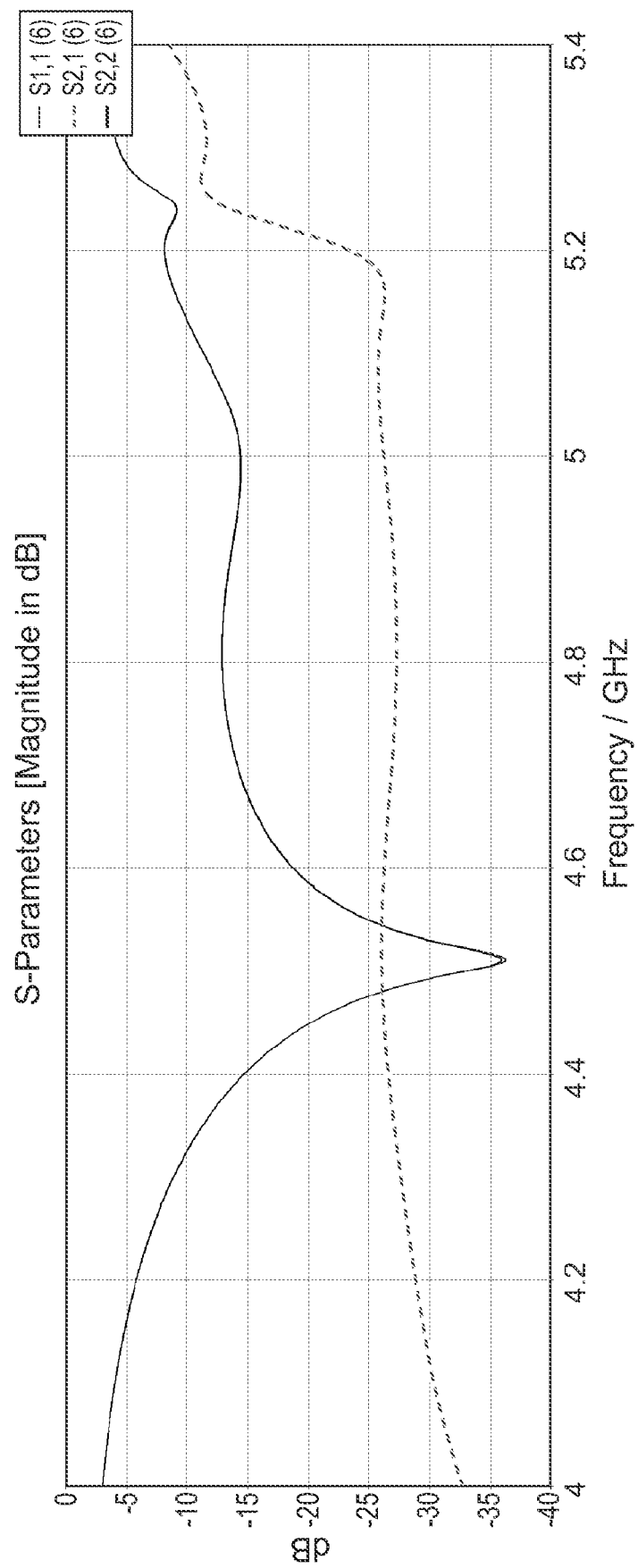
FIGS. 14A, 15A, 16A, 17A, 18A and 14B, 15B, 16B, 17B, 18B show subject matter described herein.
Figure 14B:
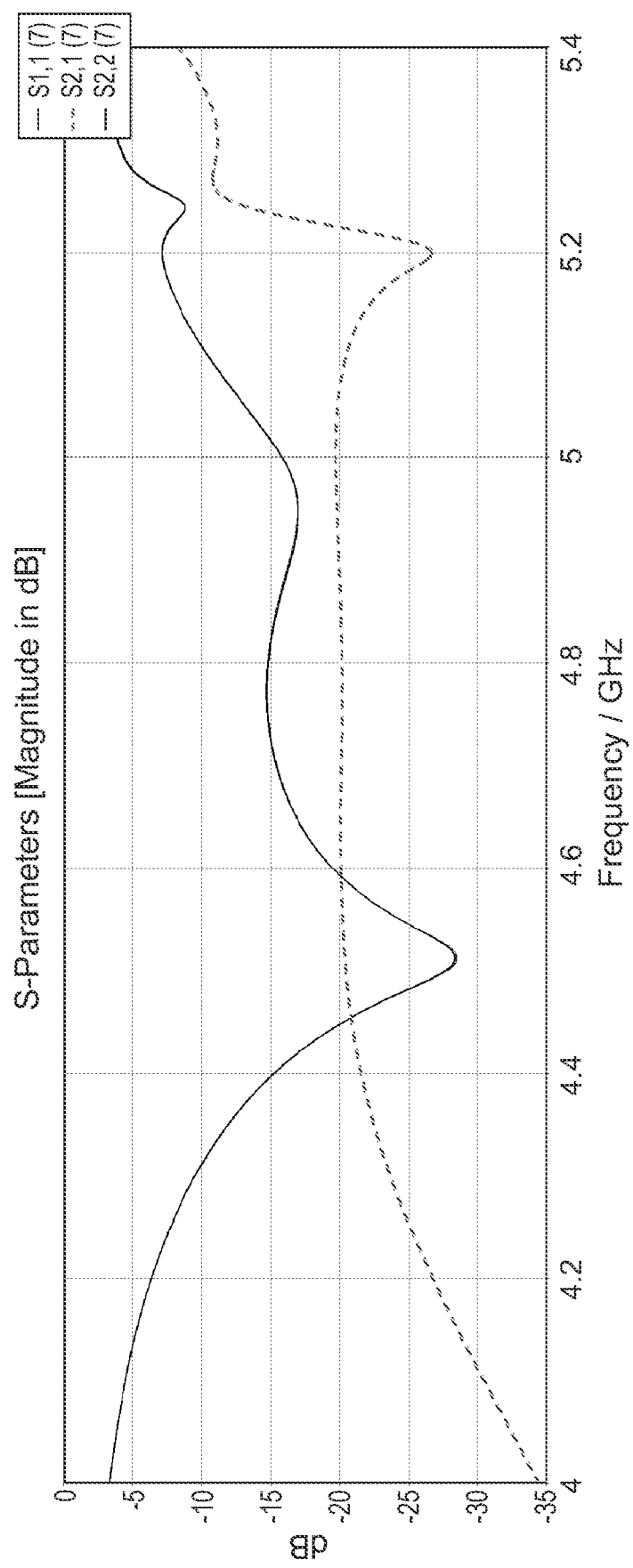

FIGS. 14A, 14B illustrate variation of reflection coefficients S11 and S12 (range −40 dB to 0 in FIG. 14A; −35 dB to 0 in FIG. 14B) with frequency (range 4 to 5.4 GHz in both FIGs).

Figure 15A:
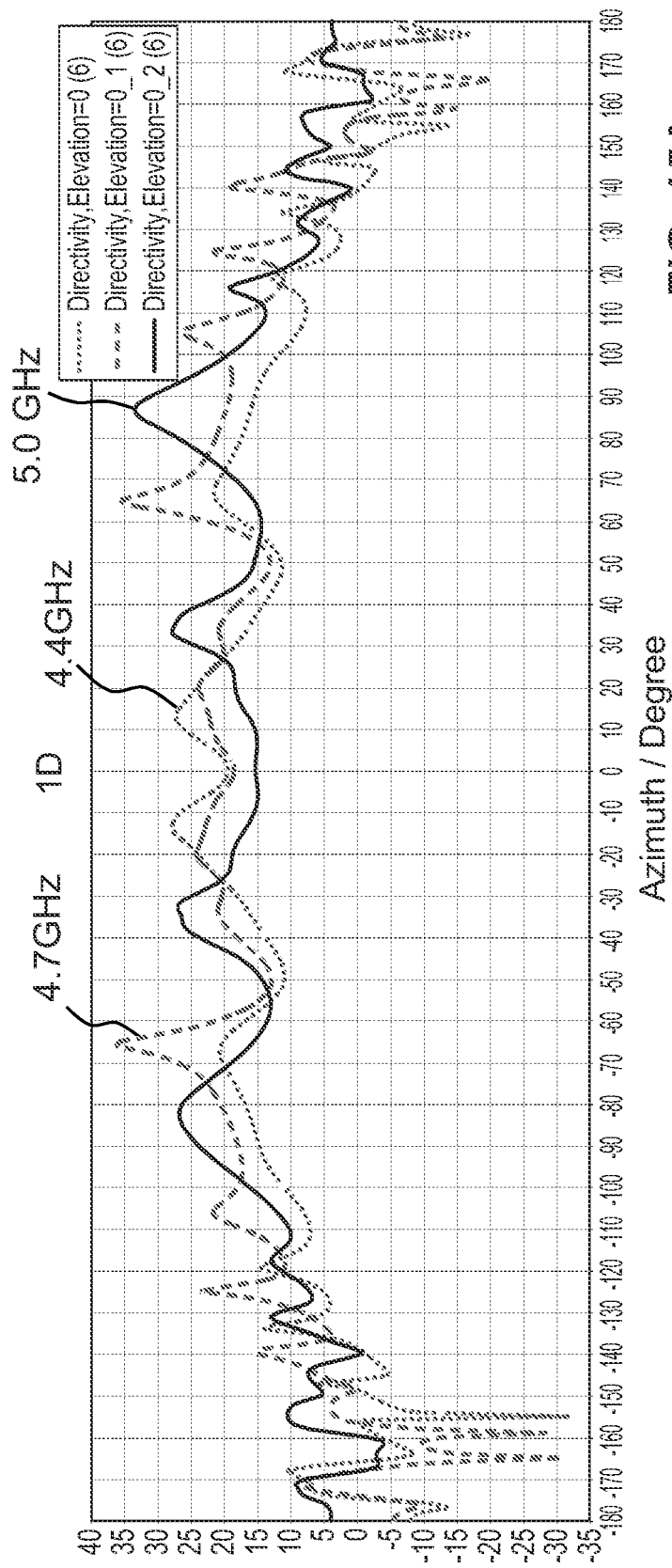
Figure 15B:
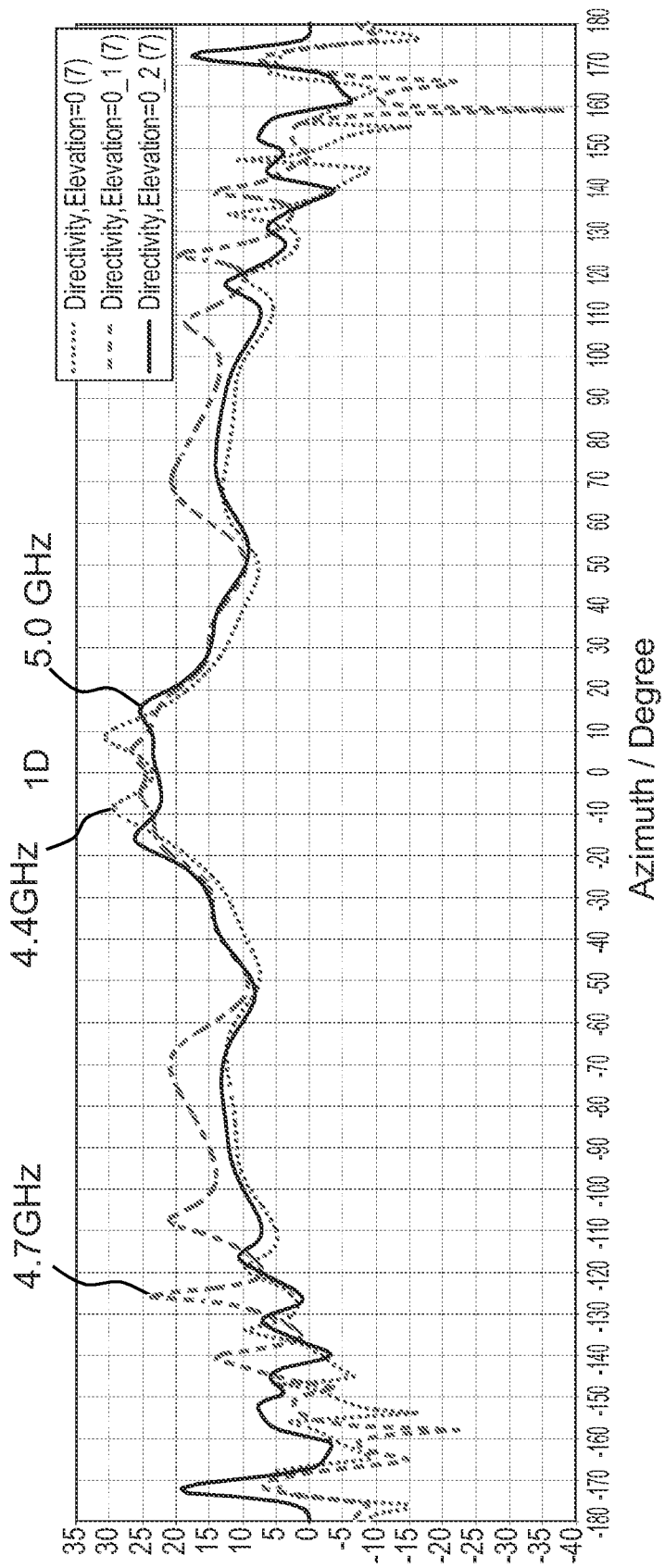

FIGS. 15A, 15B illustrate variation of XPD Cross Polar Discrimination ("Co-polar gain"—"X-polar gain") with azimuthal angle for a beam steered at boresight. The different traces are for 4.4 GHz, 4.7 GHz and 5 Ghz.

Figure 16A:
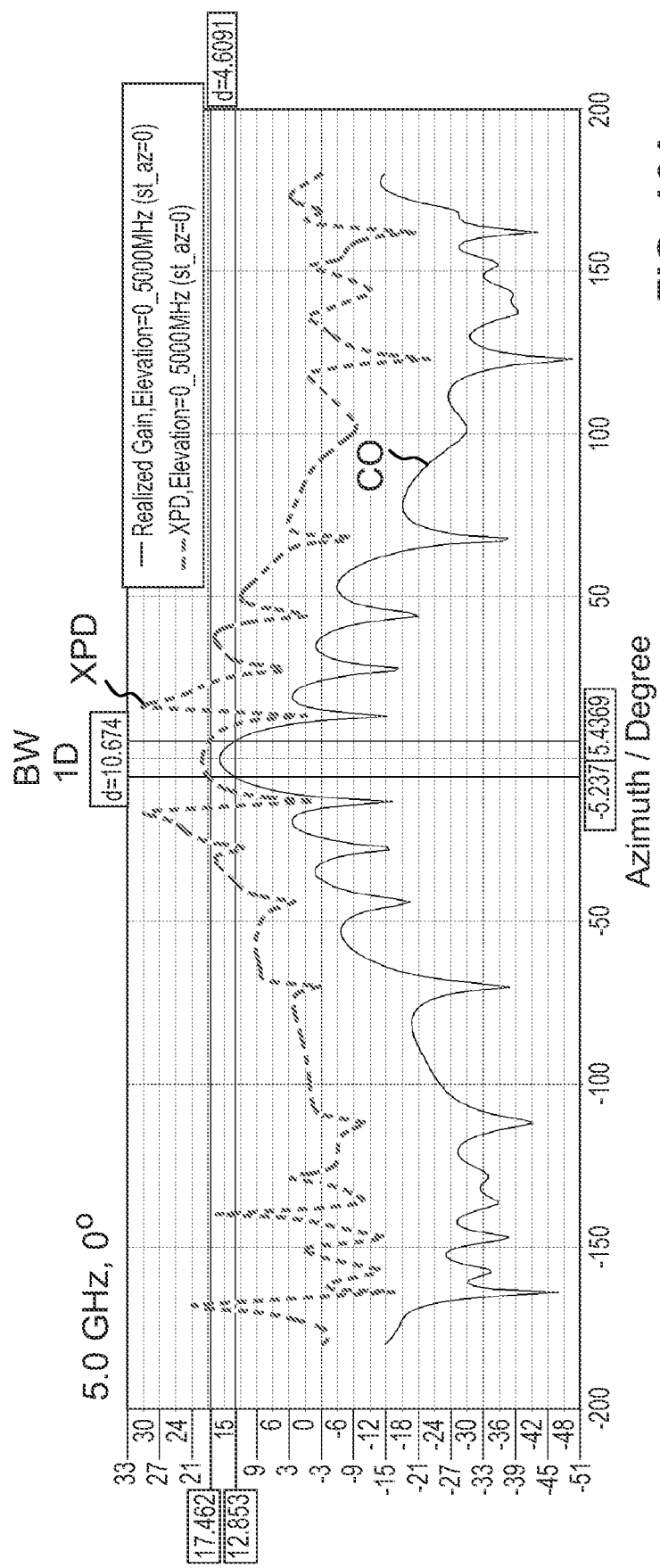
Figure 16B:
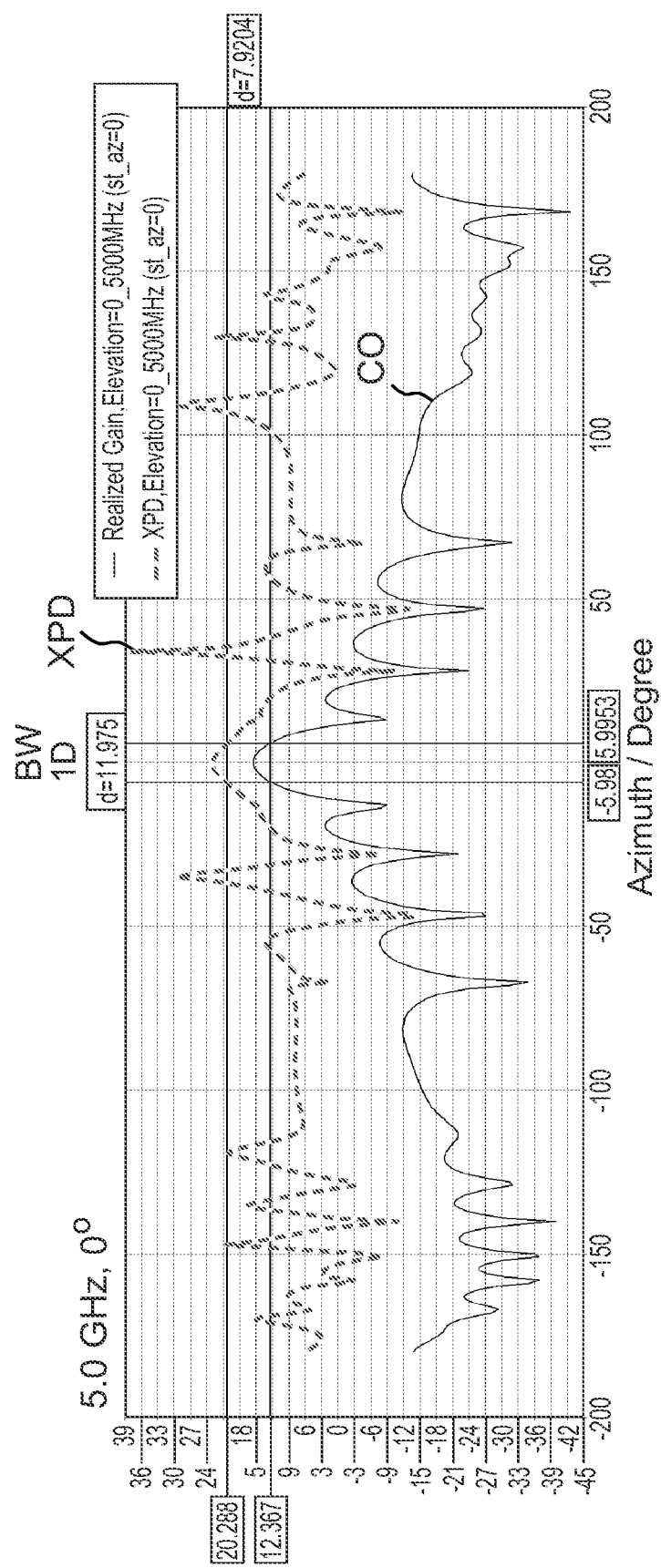
Figure 17A:
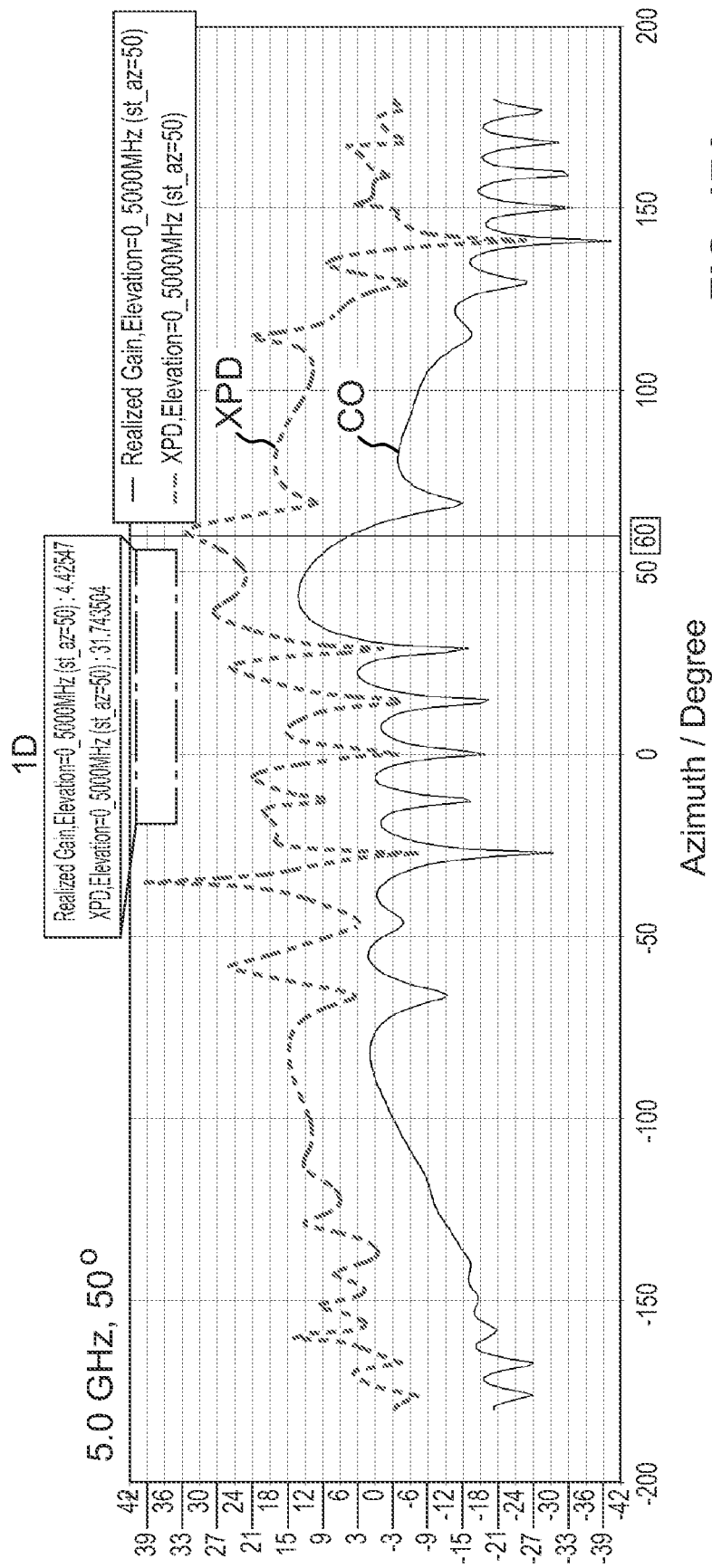
Figure 17B:
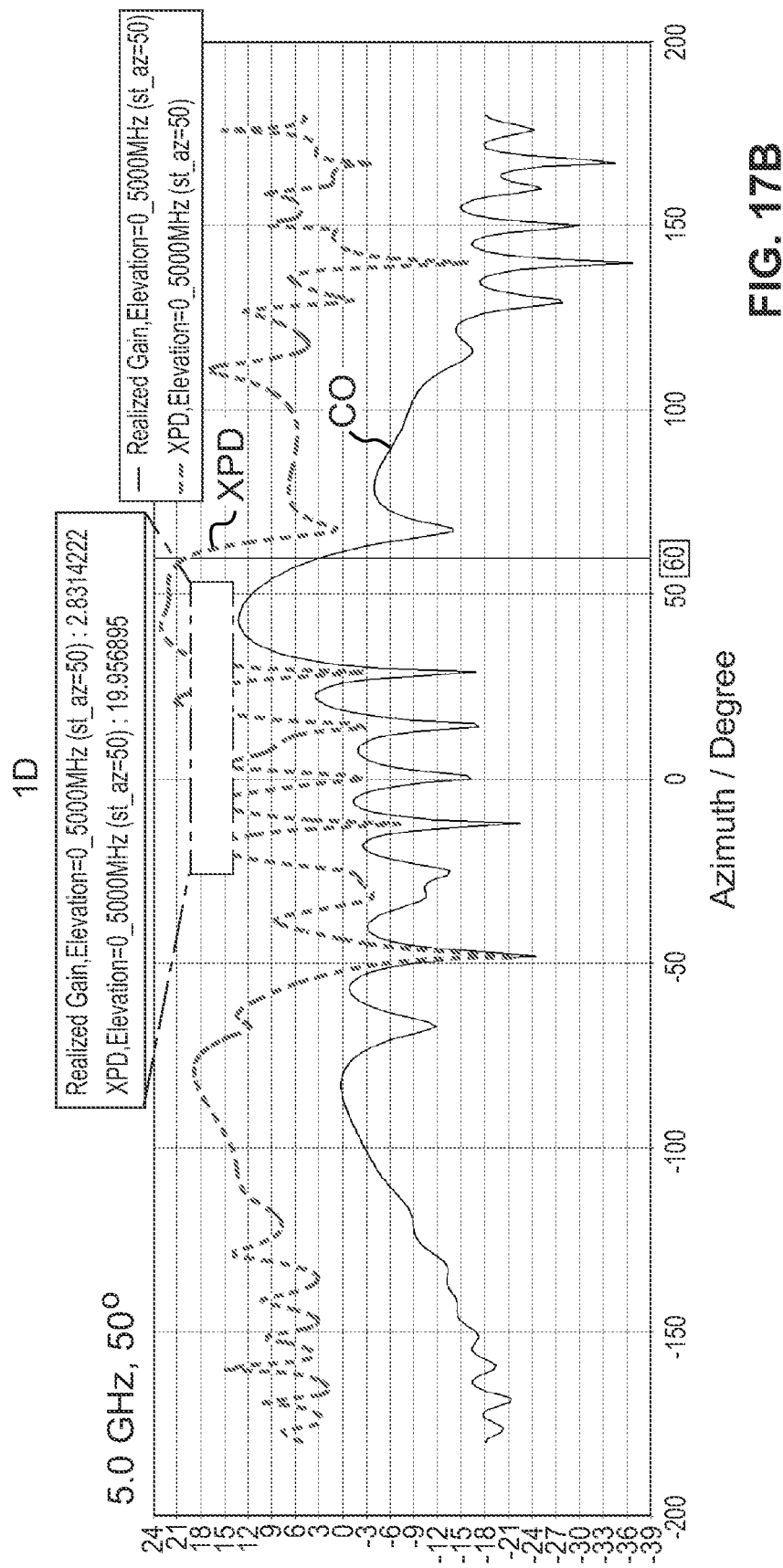
Figure 18A:
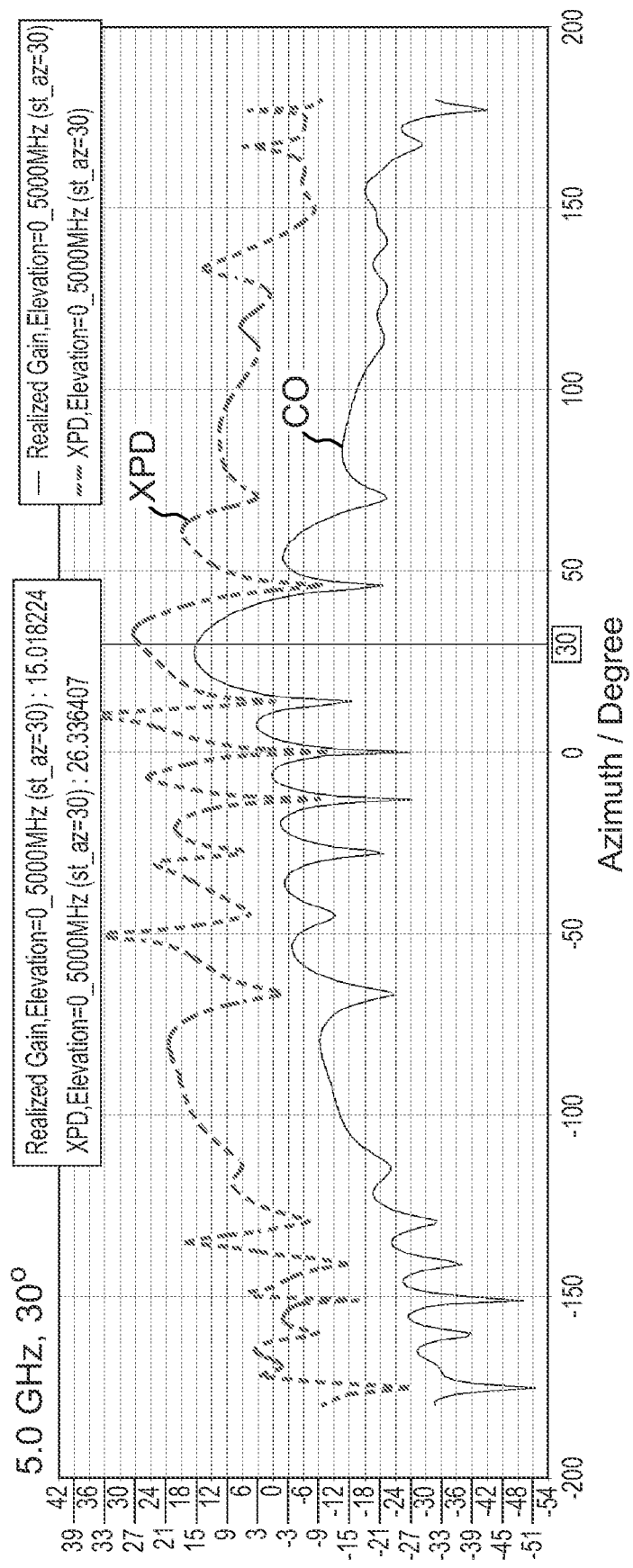
Figure 18B:
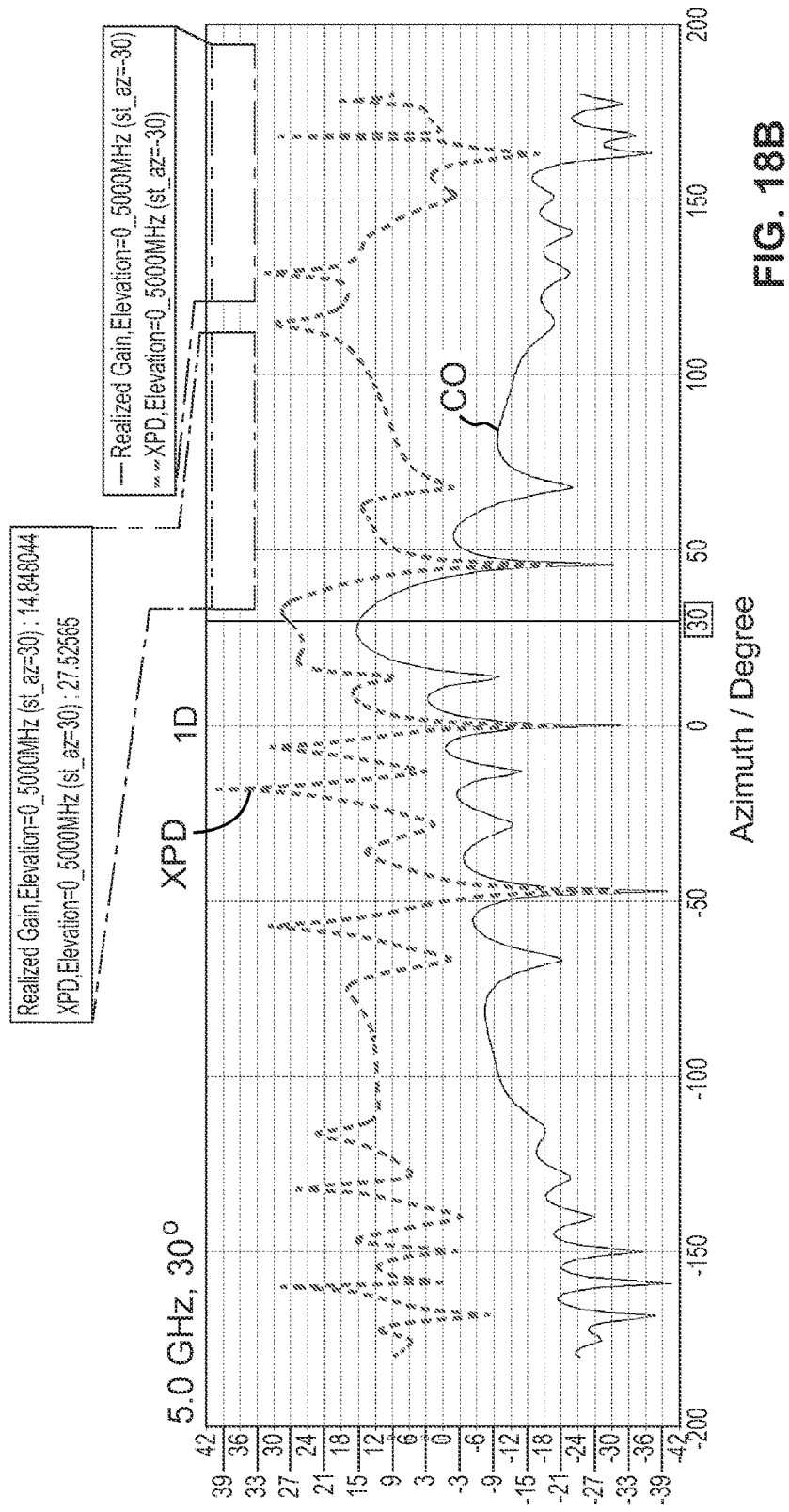

FIGS. 16A, 17A, 18A illustrate variation of Cross Polar Discrimination (XPD) and co-polar gain (CO) with azimuthal angle at 5 GHz, for beam steering angles of 0° (FIG. 16A), 50° (FIG. 17A) and 30° (FIG. 18A) where the apparatus 10 is without coupling elements 40 and FIGS. 16B, 17B, 18B illustrate variation of Cross Polar Discrimination (XPD) and co-polar gain (CO) with azimuthal angle at 5 GHz, for beam steering angles of 0° (FIG. 16B), 50° (FIG. 17B) and 30° (FIG. 18B) where the apparatus 10 has coupling elements 40. Cross Polar Discrimination XPD is the difference between the co-polar gain and cross-polar gain (log scale).

At beam steering in the boresight direction 0° (FIG. 16B), XPD is greater over a 3 dB beamwidth BW compared to FIG. 16A. The presence of coupling elements 40 significantly improves XPD at boresight. At beam steering towards a sector edge direction 50° (FIG. 17B), XPD is not compromised by the presence of coupling elements 40.

At beam steering within the sector 30° (FIG. 17C), XPD is not compromised by the presence of coupling elements 40.

There are similar results for other frequencies and other beam steering angles.

Cross-polar discrimination (XPD) over 4400-5000 MHz is >20 dB @ boresight and >10 dB over whole steering range. Isolation towers 60 can be used to increase XPD at edges. Coupling elements 40 (and increased coupling) can be used to increase XPD at boresight.

When the coupling between patches and the coupling elements 40 is increased (longer coupling element) the XPD increases (X-pol component decreases) at azimuth angles close to boresight but gets worse at larger azimuth angles close to sector edges. Because the co and cross-polarization beam of the whole array 20 is the sum of the array 20 one can then use this effect to improve (or control) the overall XPD of the array 20 beam by using tight coupling at the middle columns 22 of the array 20 and loose coupling at the edges.

The apparatus 10 uses floating coupling strips 40 added between patch radiators 32 to adjust the cross polar component level of each column 22 of the array. Columns 22 are used to form a sum beam of the whole array 20. To achieve good XPD over a wide horizontal sector, different coupling (from the coupling elements 40) is applied at each array 20 column 22 depending on the column 22 position in the array 20. Tight couplings (narrow gaps) are used at the middle columns 22 of the array 20 and loose couplings (wide gaps) or no coupling elements 40 are used at the array 20 edges.

The coupling is between a specific coupling element 40 and a patch radiator 32 on either side of it in a particular column.

The apparatus has particular application as a beam steering array 20 for higher frequency products (>2 GHz) products.

A product can be a base station system or a portable electronic device.

The apparatus can have particular application as a beam steering array 20 for sub-6 GHz products especially on the highest sub-6 GHz frequency variants at 4400-5000 MHz. Element cross-polar discrimination (XPD) over 4400-5000 MHz band needs to be >20 dB @ boresight and >10 dB over whole steering range to minimize leakage between MIMO channels and also to minimize channel noise.

The apparatus 10 provides a digital beam steering array 20 below 6 GHz that supports multi-user-MIMO (multi-input multi-output) and provides sufficient horizontal and vertical beam steering range over a wide frequency bandwidth with stable peak gain. The manufacturing cost of the apparatus 10 is low and it is light weight (low mass).

Although the above example focuses on the frequency range 2.3-5 GHz, the same approach can be used at other frequencies.

Figure 19:
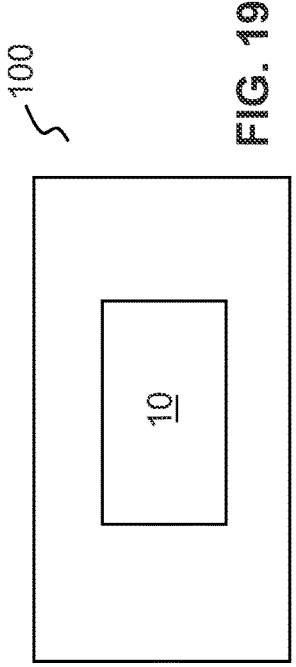
FIG. 19 shows another example of the subject matter described herein.

FIG. 19 illustrates an example of product 100, for example a portable electronic device or a base station system (or part of a base station system)

Thea base station system 100 (or part of a base station system) can be configured for beamforming, for example, multiple-input multiple-output (MIMO) operation and can comprise the apparatus 10 as previously described for beam-steering.

Where a structural feature has been described, it may be replaced by means for performing one or more of the functions of the structural feature whether that function or those functions are explicitly or implicitly described.

An operational resonant mode (operational bandwidth) is a frequency range over which an antenna can efficiently operate. An operational resonant mode (operational bandwidth) may be defined as where the return loss S11 of the antenna is greater than an operational threshold T.

The above described examples find application as enabling components of:
automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example.

The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

I claim:
1. An apparatus comprising:
a ground plane;
an array of antennas, wherein the array comprises antennas arranged in parallel rows and parallel columns, wherein each of the antennas in the array of antennas comprises a radiator and feeds for a first polarization and a second polarization orthogonal to the first polarization;

wherein for one or more columns of the antennas in the array, there is an aligned arrangement of coupling elements comprising coupling elements between the antennas in the respective column, wherein the coupling elements are separate from the antennas and are electrically floating, wherein the coupling elements are closer to adjacent antennas in a column of the array, in a column direction, for a column towards a center of the array of antennas than for a column towards a periphery of the array of antennas, such that a length of the coupling elements decreases with distance in a first direction from a center of the array of antennas, and a size of a gap in a second direction orthogonal to the first direction increases with distance in the first direction from the center of the array of antennas.

2. An apparatus as claimed in claim 1, wherein the coupling elements increase cross-polarization discrimination for the array of antennas, at boresight, being a direction orthogonal to a flat plane of the array of antennas.

3. An apparatus as claimed in claim 1, wherein the coupling elements are elongate having a length greater than a width, and wherein the aligned arrangement of coupling elements in the respective columns are aligned lengthwise.

4. An apparatus as claimed in claim 1, wherein the aligned arrangement of coupling elements in a respective column are arranged along a virtual line that bi-sects the antennas of the respective column.

5. An apparatus as claimed in claim 1, wherein the coupling elements are flat conductive elements.

6. An apparatus as claimed in claim 1, wherein a printed wiring board comprises the coupling elements and comprises the antennas.

7. An apparatus as claimed in claim 1, wherein a respective column of the aligned arrangement of coupling elements comprises coupling elements of the same size and shape between the antennas of the respective column.

8. An apparatus as claimed in claim 1, wherein the coupling elements do not vary their characteristics in a column direction.

9. An apparatus as claimed in claim 1, wherein the coupling elements vary their characteristics in a row direction.

10. An apparatus as claimed in claim 1, configured to perform controlling at least phase between feeds.

11. An apparatus as claimed in claim 1, configured to perform providing a relative phase adjustment to groups of antennas in the array of antennas, wherein the same relative phase adjustment is applied to antennas within a group and different relative phase adjustment is applied to antennas in different groups to effect beam-steering.

12. An apparatus as claimed in claim 1, further comprising grounded isolation towers positioned at corners of antennas in the array of antennas.

13. An apparatus as claimed in claim 1, wherein the apparatus is a base station, a base station system, or a part of a base station system.

14. An apparatus as claimed in claim 13, wherein the apparatus is configured for multiple input multiple output operation.

15. An apparatus as claimed in claim 1, wherein the apparatus is a portable electronic device.

16. An apparatus as claimed in claim 15, wherein the apparatus is configured for multiple input multiple output operation.

* * * * *